UNITED STATES PATENT OFFICE.

ALEXANDER D. ELBERS, OF HOBOKEN, NEW JERSEY.

PROCESS OF TREATING BLAST-FURNACE SLAG.

SPECIFICATION forming part of Letters Patent No. 579,820, dated March 30, 1897.

Application filed November 25, 1896. Serial No. 613,397. (No specimens.)

*To all whom it may concern:*

Be it known that I, ALEXANDER D. ELBERS, of Hoboken, in the county of Hudson and State of New Jersey, have invented a new and Improved Process of Treating Blast-Furnace Slag, of which the following is a full, clear, and exact description.

The invention has for its object to adapt slag that is suitable for my treatment for use in admixture with hydraulic cement as an ingredient for mortar and for similar purposes.

The invention consists in a novel process for treating sulfurous blast-furnace slag in its ground or pulverized state with a weak solution of nitric acid in such manner that it becomes superficially desulfurized as well as impregnated with nitrosyl, (NO;) and the invention also consists in the improved material produced by the said improved process, which may be chemically termed "nitrosylized slag," all as hereinafter more fully described, and pointed out in the claims.

As an admixture to hydraulic cement, such as Portland, Rosendale, &c., crude blast-furnace slag is considered an adulterant, chiefly for the reason that the slag which readily yields gelatinous silica, and therefore is capable of promoting cementation, also carries soluble and decomposable sulfids that are apt to impair or even destroy the cohesion of the mass that contains them long after it has become indurated, whereas the slag that does not contain such impurities is, as a rule, too insoluble to promote cementation to any more appreciable extent than ordinary sand does. Blast-furnace slag can be completely desulfurized by roasting it in a very intense heat. This process is, however, too expensive, because its successful operation involves many difficulties. Besides, the intense heating has the effect of rendering the slag less soluble than it is in the crude state. On the other hand, the crude slag is rendered available for cement, &c., in a comparatively inexpensive manner and does not lose any of its solubility when it is treated after the method hereinafter described.

By my improved treatment the slag becomes only superficially desulfurized, but in such an effective manner that the still sulfurous interior of the slag particles cannot become disclosed by such chemical reactions as are apt to take place in applied cement when it is either submerged or exposed to varying atmospheric influences. Moreover, the absorption of nitrosyl prevents the ferruginous-slag particles from changing superficially to ferric hydrate, which is an injurious reaction, because it interferes with the progress of hydraulic cementation. The slag that is most suitable for the treatment has an oxygen ratio somewhat above the singulo-silicate (1:1) standard, is high in lime and alumina, and contains from one to two per cent. of calcium sulfid. The proportions of its essential constituents range within the following limits, viz: $SiO_2$ equals thirty-eight per cent. to forty-two per cent., CaO equals forty per cent. to forty-five per cent., $Al_2O_3+Fe$ equals sixteen per cent. to eighteen per cent., and when molten slag of such composition is cooled suddenly it becomes vitrified and assumes a dark greenish color, which is a certain indication that it is sufficiently ferruginous for the treatment.

The term "ferruginous" as herein applied means that the slag contains an appreciable proportion of ferrous silicate in constitutional combination and more or less of oxid of iron or of partly-reduced oxid in admixture.

When such slag is mixed in its ground or pulverized state with a weak solution of nitric acid, the latter reacts most readily on the calcium sulfid, with which it forms calcium nitrate; but before this reaction, which is accompanied by the evolution of hydrogen-sulfid gas, can go very deep another portion of the acid enters with the ferruginous matter of the slag into various and rather complex reactions, the final outcome of which results in the formation of some ferrous, or even ferric, nitrate, as well as in the liberation of nitrosyl, and the latter is eagerly absorbed by the ferruginous-slag particles and imparts to the mass a darker color. After removing the nitrates by leaching, the mass is dried at a moderate heat and is then ready to be put up for use as nitrosylized slag.

As regards the usefulness of this material I find that mixtures of one part of hydraulic cement and from one to five parts of nitrosylized slag show much better results within the same period of submergence than cement that is mixed with corresponding proportions of sand, that mixtures consisting of one part of Portland cement and of eleven parts of nitrosylized slag that has passed through a sieve having one hundred and eighty meshes to the linear inch harden still considerably under water within seven days, and that the parts that contain nitrosylized slag stand the usual shrinkage tests as well as those made of neat cement. I also find that ordinary mortar hardens better when it is mixed with nitrosylized slag, especially when the lime has been slaked in admixture with the slag, and that a fat or quick-slaking lime can be rendered hydraulic by such admixture.

I now proceed to describe how the process can be carried out.

In order to prepare the slag for the treatment with acid, crude slag taken from the cinder-bank, as well as granulated slag, may be used. Either kind may be ground wet or dry, and the wet-ground slag may either be dried or used in its wet state for the subsequent treatment. I prefer, however, to use only slag that has been vitrified by casting it in cumulative layers. This method is best carried out by flushing the molten slag from a lateral tap-hole of a cinder-car in a broad sheet, about two feet wide, over the inclined plane or side of the cinder-bank and by moving the car to and fro while flushing, so that the slag spreads itself on the ground in layers about half an inch thick. The layers that are thus cast on top of each other, whether a few or a hundred, gradually detach themselves from each other and break up into small pieces that can be easily shoveled and transported in bulk. I prefer to grind this material dry and so fine that at least ninety per cent. of it will pass through a sieve of one hundred and eighty meshes to the linear inch. The slag thus pulverized I mix with about one-fourth part by weight of a weak solution of nitric acid or with just enough to have the slag thoroughly soaked without any liquor gathering on the surface. The mixing is best done by charging a measured quantity of the slag into tanks or vats that contain a corresponding portion of the solution. These receivers should be provided with a hood and a draft-chimney, because a rather copious evolution of hydrogen-sulfid gas sets in almost as soon as the slag comes in contact with the solution. After letting the soaked mass stand about an hour or two it should then be mixed with enough of water to convert it into a thin pulp, and after allowing the slag particles to settle the liquor that has gathered on top should be drawn off. This operation may be repeated once or twice within a few hours, but when the slag is of suitable composition one leaching, continued for about twelve hours, will be found sufficient to entirely free the slag from remnants of deliquescent matter. The slag thus treated may be dried in any convenient manner either in the open air or in a moderate artificial heat, always taking care that it be not heated so highly as to render its contents of soluble silica insoluble. The slag thus prepared is ready for use and may be packed, shipped, and stored in any convenient manner, inasmuch as its efficiency is not seriously affected by dampness and moisture.

The strength of the solution that is to be employed is easily determined by experiment. Aside from the superficial eradication of the decomposable sulfids the main object is to nitrosylize the slag with as little formation of additional nitrates as possible, and I find that in many cases an aqueous solution containing about one and three-quarters per cent. of nitric oxid, ($N_2O_5$,) or of a density somewhat above 2° of Twaddell's scale, answers the purpose. This is equivalent to the use of about half a pound of sixty-per-cent. acid for the treatment of one hundred pounds of slag.

In order to render the solution more productive of nitrosyl, it may be partially decomposed before the slag is mixed with it, which can be accomplished by allowing the solution to react on wrought-iron scrap, which may be taken out as soon as the decomposition has progressed far enough, and in many other well-known ways.

Having thus described my invention, I claim as new and desire to secure by Letters Patent—

1. The herein-described process of treating sulfurous blast-furnace slag in its ground or pulverized state, which consists in superficially desulfurizing the slag and impregnating it with nitrosyl, substantially in the manner set forth.

2. The herein-described process of treating sulfurous blast-furnace slag in its ground or pulverized state, which consists in superficially desulfurizing the slag and impregnating it with nitrosyl by the application of a weak solution of nitric acid, substantially as described.

3. An improved product consisting of superficially desulfurized and nitrosylized slag, substantially as herein set forth.

ALEXANDER D. ELBERS.

Witnesses:
J. FRED. ACKER,
JNO. M. RITTER.